US012780603B2

(12) United States Patent
Miriyala

(10) Patent No.: US 12,780,603 B2
(45) Date of Patent: Nov. 3, 2026

(54) METHOD AND SYSTEM FOR PROVIDING COMMUNICATION SERVICES TO ELEVATOR PASSENGER

(71) Applicant: OTIS ELEVATOR COMPANY, Farmington, CT (US)

(72) Inventor: Pradeep Miriyala, Hyderabad Telangana (IN)

(73) Assignee: OTIS ELEVATOR COMPANY, Farmington, CT (US)

(*) Notice: Subject to any disclaimer, the term of this patent is extended or adjusted under 35 U.S.C. 154(b) by 584 days.

(21) Appl. No.: 18/482,341

(22) Filed: Oct. 6, 2023

(65) Prior Publication Data

US 2025/0115460 A1 Apr. 10, 2025

(51) Int. Cl.
*B66B 5/02* (2006.01)
*B66B 1/34* (2006.01)

(52) U.S. Cl.
CPC ............ *B66B 5/021* (2013.01); *B66B 1/3446* (2013.01)

(58) Field of Classification Search
CPC ........... B66B 5/021; B66B 5/027; B66B 1/34; B66B 5/0006; B66B 1/3446
USPC .......................................................... 187/380
See application file for complete search history.

(56) References Cited

U.S. PATENT DOCUMENTS

| | | | |
|---|---|---|---|
| 11,312,594 B2 | 4/2022 | Oggianu et al. | |
| 2011/0171895 A1* | 7/2011 | Tanishima | B66B 11/0226 454/68 |

FOREIGN PATENT DOCUMENTS

| | | | |
|---|---|---|---|
| CN | 115924675 | A | 4/2023 |
| DE | 102017223073 | A1 | 6/2019 |
| JP | 2020141238 | A | 9/2020 |
| JP | 2020196594 | A | 12/2020 |
| JP | 2023028528 | A | 3/2023 |
| KR | 102208245 | B1 | 1/2021 |

OTHER PUBLICATIONS

Nakamura et al. (JP 2000072348 A), Automatic Communication Device for Elevator (Year: 2000).*
Takahashi (JP 2009051641 A), System for Checking In-Car State of Elevator When Abnormality Occurs (Year: 2009).*
Qian et al. (CN 110451380 A), Elevator Trapped Automatic Rescue Method And Device Of Elevator (Year: 2019).*
Maruiwa (JP 2000143110 A), Abnormality Announcing Device of Elevator (Year: 2000).*
Ohama (JP 2009256021 A) System Operated When Shut up in Elevator (Year: 2009).*
Kumakura et al. (JP 2020196594 A) Elevator Position Identifying System and Elevator Position Identifying Method (Year: 2020).*
Maruoka et al. (JP 2020141238 A) Device Identification System (Year: 2020).*

(Continued)

*Primary Examiner* — Jorge L Carrasquillo
(74) *Attorney, Agent, or Firm* — CANTOR COLBURN LLP

(57) ABSTRACT

An elevator system having an elevator car, a controller operationally coupled to the elevator car, and a communication device in communication with the controller. The controller is configured to execute a program, upon determining the occurrence of an alert condition related to the elevator car while a passenger or mechanic is trapped within the elevator car, to thereby communicate with the passenger or mechanic utilizing the communication device.

14 Claims, 4 Drawing Sheets

(56) References Cited

OTHER PUBLICATIONS

EP Application No. 24204108.5, EP Partial Search Report Issued Mar. 12, 2025, 18 pages.
EP Application No. 24204108.5, EP Search Report Issued Jun. 2, 2025, 17 pages.
"Transforming Categorical Data", Machine Learning, Google for Developers, https://developers.google.com/machine-learning/data-prep/transform/transform-categorical, 9 pages.
"Univariate Time Series Anomaly Detection Using ARIMA Model", Analytics Vidhya, 5 pages.
Ahern, "Chatbot Architecture: A Simple Guide", Ometrics, https://www.ometrics.com/blog/a-simple-guide-to-chatbot-architecture/, 15 pages.
de Ligt, Amber, "Offline ChatGPT: Your Personal AI Chat Companion Anywhere, Anytime", EcoAGI, https://ecoagi.ai/topics/ChatGPT/offline-chatgpt, 4 pages.
GPT4AII, Nomic, A free-to-use, locally running, privacy-awarechatbot, https://gpt4all.io/index.html, 1 page.
Vaswani et al., "Attention Is All You Need", arXiv:1706.03762v7 [cs.CL] Aug. 2, 2023, 31st Conference on Neural Information Processing Systems (NIPS2017), Long Beach, CA.

* cited by examiner

METHOD AND SYSTEM FOR PROVIDING COMMUNICATION SERVICES TO ELEVATOR PASSENGER

BACKGROUND

The embodiments described herein relate to an elevator system and more specifically to a method and system for providing communication services to elevator passenger.

During a trapped passenger assistance (TPA) scenario, a passenger may seek support by using video and voice solutions provided by the elevator system, e.g., via a remote service center, or a fixed telephone line within the elevator car. The success of these solutions may be dependent on network traffic and may impose challenges in terms of quickly and efficiently establishing a connection between the elevator car and the service center. Further, mechanics often work in elevator cars located in sites where an internet connection may be unstable, thus preventing them from quickly obtaining help from the remote service center.

BRIEF SUMMARY

Disclosed is an elevator system having an elevator car, a controller operationally coupled to the elevator car, and a communication device in communication with the controller. The controller is configured to execute a program, upon determining the occurrence of an alert condition related to the elevator car while a passenger is trapped within the elevator car, to thereby communicate with the passenger utilizing the communication device.

In addition to one or more of the aspects of the system or as an alternate, the controller includes a processor and non-transitory memory, and the program is a compressed transformer model that is stored on the non-transitory memory, so that the processor is configured to execute the program via edge computing.

In addition to one or more of the aspects of the system or as an alternate, the program is a natural language processing (NLP) model.

In addition to one or more of the aspects of the system or as an alternate, the program is a chatbot.

In addition to one or more of the aspects of the system or as an alternate, the program is trained via one or more of periodic receipt of training data and model updates from a remote server.

In addition to one or more of the aspects of the system or as an alternate, the program is configured to attempt to initiate a two-way communication with a remote service center and continue to communicate with the passenger during the alert condition until the two-way communication with the remote service center is established.

In addition to one or more of the aspects of the system or as an alternate, the communication device is one or more of a speaker and visual display on board the elevator car, and a mobile phone of the passenger.

In addition to one or more of the aspects of the system or as an alternate, the alert condition is the elevator car being stopped at a landing with car doors closed for a time greater than a threshold, or the elevator car is stopped between floors for a time greater than another threshold, so that the passenger is trapped within the elevator car, and the program is configured to communicate instructions for one or more of restarting the elevator car or exiting the elevator car.

In addition to one or more of the aspects of the system or as an alternate, the system includes a sensor operationally coupled to the elevator car and the controller is configured to receive sensor data from the sensor, whereby the controller determines the occurrence of the alert condition.

In addition to one or more of the aspects of the system or as an alternate, the sensor is one or more of LIDAR and a smart wearable on the passenger.

Further disclosed is a method of communicating with an elevator passenger on an elevator car during an alert condition. The method includes executing a program, by a controller of the elevator car, upon determining the occurrence of the alert condition related to the operation of the elevator car while the passenger is trapped within the elevator car, and initiating, by the controller while executing the program, a communication with a remote service center, and continuing to communicate with the passenger utilizing a communication device during the alert condition until the communication with the remote service center is established.

In addition to one or more of the aspects of the method or as an alternate, the method includes communicating instructions including one or more of restarting the elevator car or exiting the elevator car to the passenger.

In addition to one or more of the aspects of the method or as an alternate, the method includes determining the occurrence of the alert condition when the elevator car is stopped with elevator car doors closed for a time that is greater than a threshold while the passenger is inside the elevator car, or the elevator car is stopped between floors for a time period that exceeds another threshold.

In addition to one or more of the aspects of the method or as an alternate, the method includes receiving sensor data transmitted by a sensor mounted to the elevator car or hoistway, by the controller, whereby the controller determines the occurrence of the alert condition.

In addition to one or more of the aspects of the method or as an alternate, the method includes training the program via one or more of periodic receipt of training data and model updates from a remote server.

The method of claim 11, wherein the controller includes a processor and non-transitory memory, and the program is a compressed transformer model that is stored on the non-transitory memory, so that the processor is configured to execute the program via edge computing.

In addition to one or more of the aspects of the method or as an alternate, the program is a natural language processing (NLP) model.

In addition to one or more of the aspects of the method or as an alternate, the program is a chatbot.

In addition to one or more of the aspects of the method or as an alternate, the communication device is one or more of: a speaker and visual display on board the elevator car, and a mobile phone of the passenger.

In addition to one or more of the aspects of the method or as an alternate, the sensor is one or more of LIDAR and a smart wearable on the passenger.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the Figures.

Figure 1:
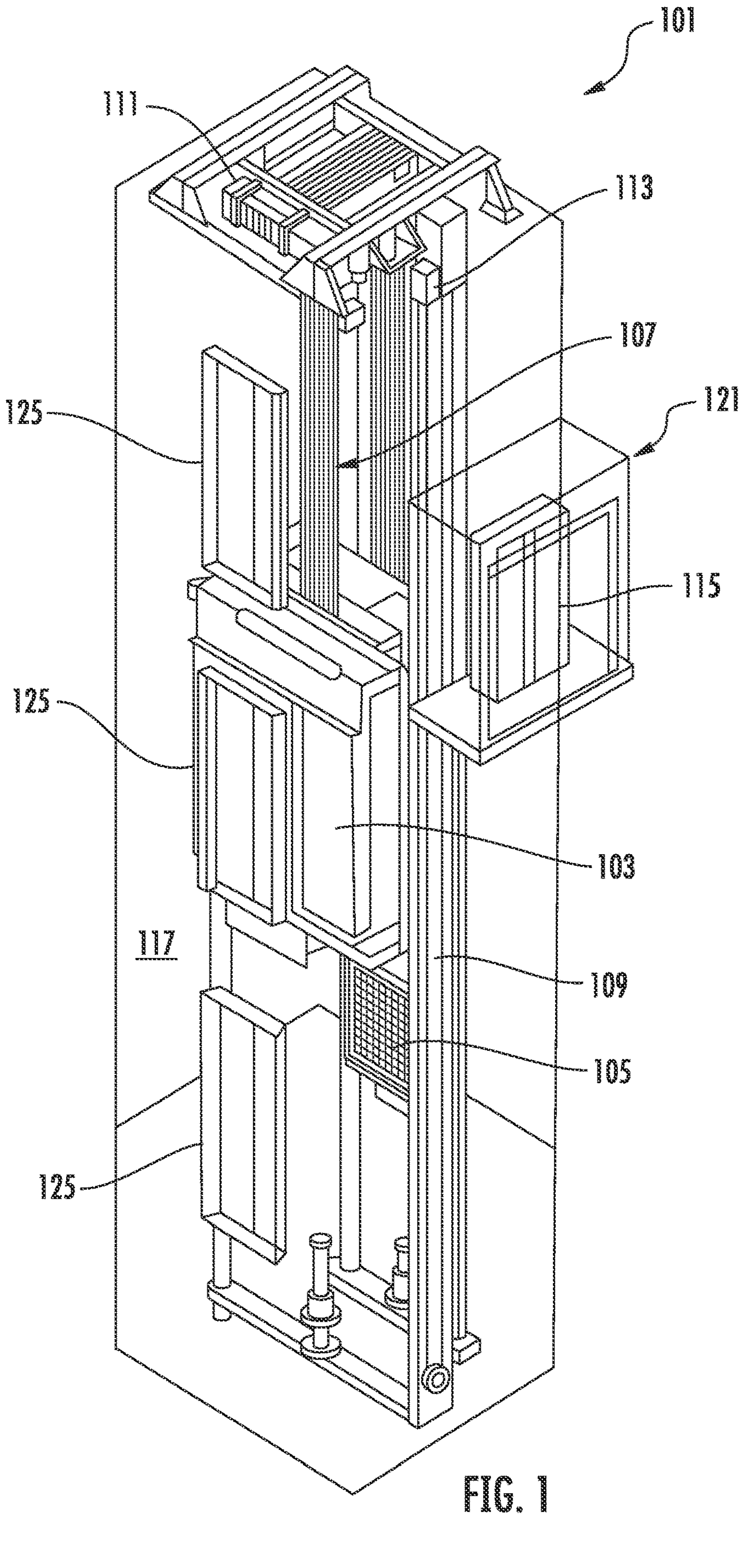
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail (or rail system) 109, a machine (or machine system) 111, a position reference system 113, and an electronic elevator controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft (or hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 may be located in a controller room 121 of the elevator shaft 117. It is to be appreciated that the controller 115 need not be in the controller room 121 but may be in the hoistway or other location in the elevator system. According to an aspect, the controller 115 is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in an controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels or traction wheels). FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
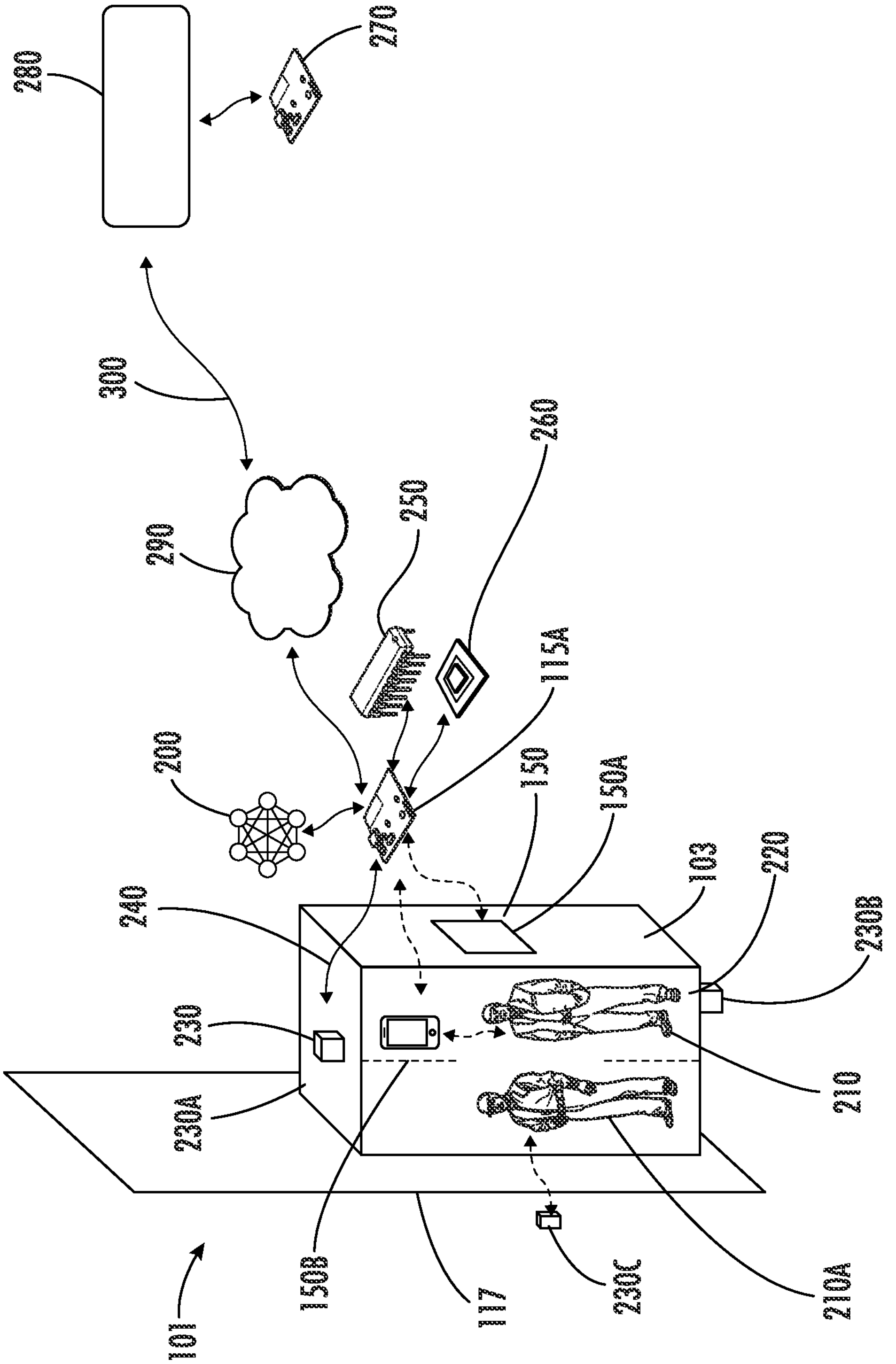
FIG. 2 shows additional aspects of the system that is configured to provide communication services to an elevator passenger, according to an embodiment.

Turning to FIG. 2, the elevator system 101 includes the elevator car 103 and a controller 115A, which may be located on the elevator car 103, but also may be located elsewhere in the hoistway/building, and operationally coupled to the car 103. A communication device, generally referenced as 150, may be in communication with the controller 115A. In one embodiment, the controller 115A is configured to execute a program 200, upon determining the occurrence of an alert condition related to the elevator car 103 while a passenger 210 is within the elevator car 103. This results in the system 101 communicating with the passenger 210 by utilizing the communication device 150.

The communication device 150 may be a speaker and/or visual display, e.g., a visual and voice implement 150A, onboard the elevator car 103. Alternatively, the communication device 150 may be a mobile phone 150B carried by the passenger 210. The alert condition may be a stopped elevator car 103, with elevator car doors 220 in closed configuration for a time period that exceeds a predetermined period of time (e.g., a threshold), or when the elevator car 103 is stopped between floors for a time period that exceeds another predetermined period of time (e.g., another threshold). With these conditions, the controller 115A may determine that the passenger 210 is trapped within the elevator car 103.

A sensor, generally referenced as 230, may be operationally coupled to the elevator car 103 and the controller 115A is configured to receive sensor data 240 from the sensor 230. From this sensor data 240, the controller 115A may determine both the presence of a passenger 210 in the car 103 and the occurrence of the alert condition while the passenger 210 is in the car 103. The sensor 230 may be LIDAR 230A, a motion sensor 230B, a smart wearable 230C on the passenger 210, or some other type of sensor 230. It is to be appreciated that the sensor 230, if a LIDAR 230A type, may be mounted within the hoistway 117 or the elevator car 103.

In one embodiment, the program 200 is stored on non-transitory memory 250 onboard the controller 115A and executed by a processor 260 onboard the controller 115A. With this configuration, the controller 115A is configured for edge computing. The program 200 may be a machine learning model such as a transformer model that is compressed for storage on the memory 250. More specifically, the program 200 may be a natural language processing (NLP) model. Yet more specifically, the program 200 be an augmented reality (AR) chatbot. The program 200 may be trained via one or more of periodic receipt of training data and model updates from a remote server 270.

During the alarm condition, the system 101 will initiate a two-way voice and video communication (e.g., a call) with a remote service center 280 utilizing the communication device 150. To establish the call, the system 101 will transmit a data stream 300 over a network 290. The data stream 300 includes voice and video data that are exchanged during the call. While initiating the call, which may take time due to, e.g., a weak transmission signal, the system 101 will continue to communicate with the passenger 210 within the elevator car 103, e.g., to provide instructions, assurances and comfort.

The system 101 may be configured to communicate assurances to the passenger 210 using local customs and communication styles. In a circumstance where the passenger 210 is a maintenance person, the system 101 may be configured to communicate instructions for one or more of restarting the elevator car 103 or exiting the elevator car 103.

Thus, the embodiments provide a chatbot that is deployed during an alert condition to communicate with a passenger 210. The chatbot may be trained with probable queries and responses. The chatbot, once trained, may run offline, on an edge processing device such as processor 260. That is, the chatbot may function as a locally running chatbot. Once a trapped passenger scenario is detected, the chatbot may automatically activate and initiate communications with the passenger 210 inside the elevator car 103. During this time, the chatbot may initiate a call with a service center 280 to alert the service center 280 about the trapped passenger. Until the service center 280 takes over, the chatbot may provide basic assurance to the trapped passenger 210. The chatbot may be trained based on a geographic (global) region of installation to handle communicate utilizing local customs and communication styles.

Further, the embodiments are configured to provide assistance to a trapped mechanic. In such scenario, the chatbot may be trained based on mechanic assistance data. There are different ways to train a chatbot, including using machine learning algorithms like supervised learning and natural language processing (NLP). Data can be collected from various sources such as conversations between maintenance personnel, as a nonlimiting example. Once use cases are defined, the AI chatbot can be trained to understand the ways that passengers will ask their questions. The chatbot may operate on a handheld device such as mobile phone 150B. The chatbot may be triggered when a hazard condition is detected via a sensor 230 installed in the hoistway 117, such as LIDAR 230A, a motion sensor 230B, smart wearables 230C on, e.g., a mechanic 210A, etc.

Figure 3:
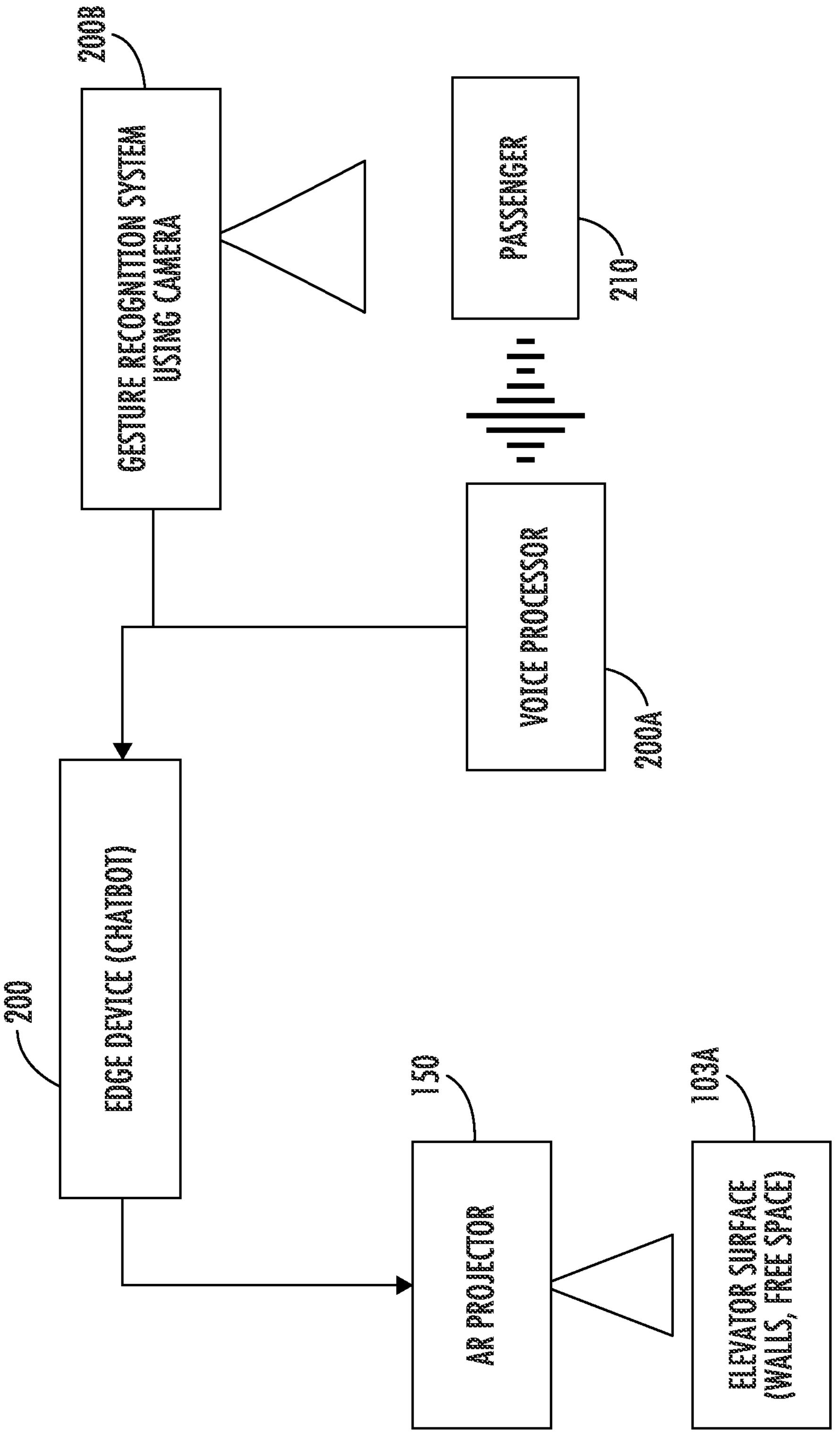
FIG. 3 shows additional aspects of the system that is configured to provide communication services to an elevator passenger, according to an embodiment.

As shown in FIG. 3, in one embodiment the communications device 150 is an AR display or an AR projector. The AR chatbot 200 works by using a text to text chatbot at its core. The response from the chatbot 200 is converted into an AR avatar and projected by the AR projector 150 to a space 103A available in the elevator car 103, which may be against a wall or other free space. This may be performed by static images not dynamically generated. A response by the passenger 210 is received by the chatbot 200 via voice processing by an AI voice recognition system 200A, e.g., using a microphone as the sensor 230 (FIG. 2) and video processing by an AI gesture recognition system 200B using, e.g., a camera as the sensor 230 (FIG. 2). A subset of conversational AI, AI voice recognition includes automatic speech recognition (ASR) and text-to-speech (TTS) to convert the human voice into text and generate a human-like voice from written words. AI gesture recognition processes human-machine interaction using body actions, typically without the aid of voice. AI gesture recognition systems typically use visual inputs, wearable sensors or both. Based on the response by the passenger 210, the chatbot 200 prepares its next response, e.g., using edge computing. The response by the chatbot 200 is translated again into AR avatar-based response and projected onto available space, as indicated. It is to be appreciated that utilizing the AI recognition processes, the system may be able to confirm the passenger is within the car during the alert condition.

Figure 4:
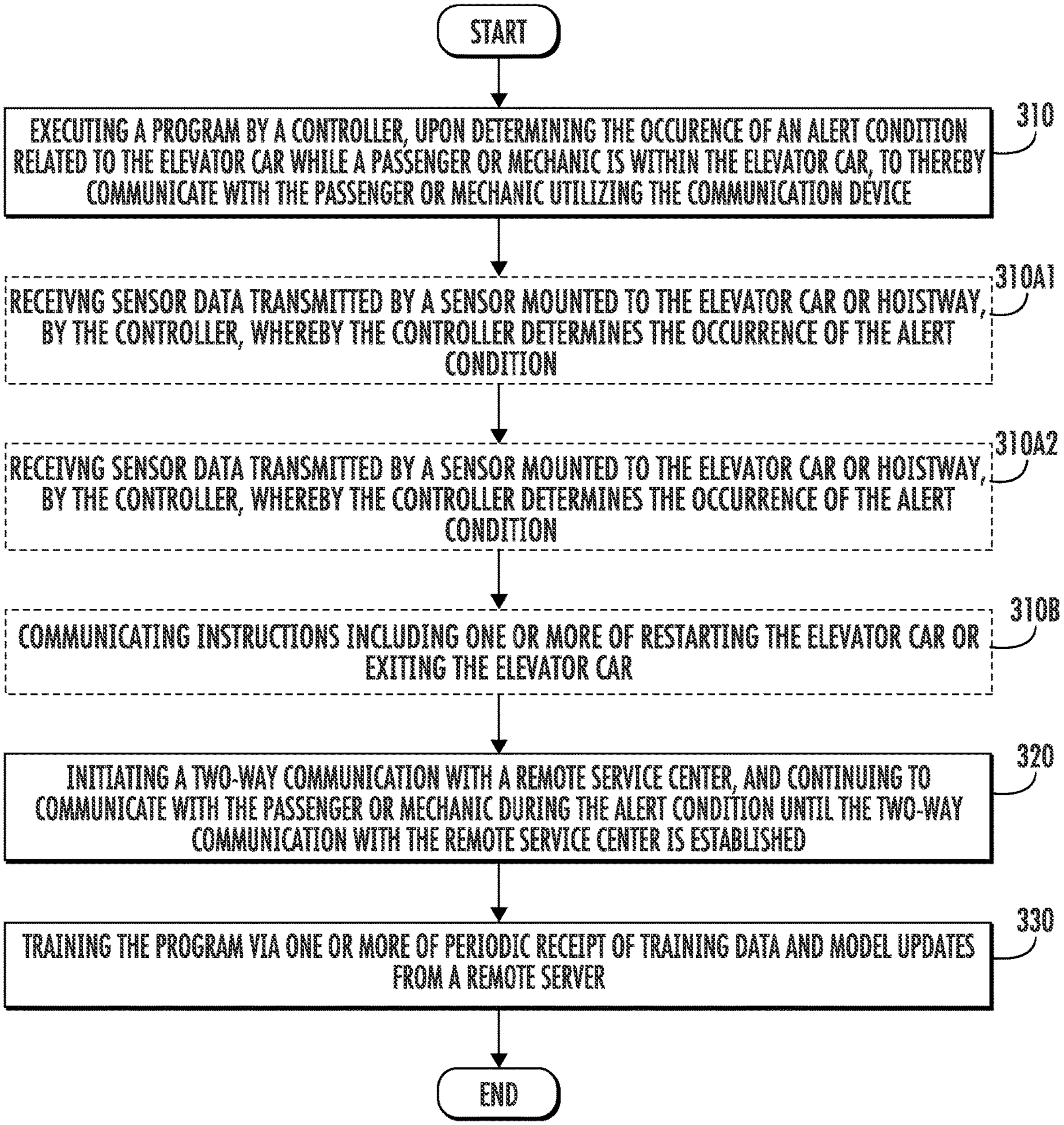
FIG. 4 is a flowchart showing a method of providing communication services to the elevator passenger, according to an embodiment.

Turning to FIG. 4, the flowchart shows a method of providing communication services to an elevator passenger 210 on the elevator car 103. As shown in block 310 the method includes executing a program 200 by a controller 115A, upon determining the occurrence of an alert condition related to the elevator car 103 while a passenger 210 is trapped within the elevator car 103. From this, the system 101 communicates with the passenger 210 utilizing the communication device 150.

Regarding the alert condition as referenced in block 310, as shown in block 310A1, in one embodiment the method includes the controller 115A receiving sensor data 240 transmitted by the sensor 230. The sensor data 240 may be one or more of voice, movement and gestures, as nonlimiting examples. From this data, the controller 115A determines the occurrence of the alert condition. As shown in block 310A2, in one embodiment the method includes the controller 115A determining the occurrence of the alert condition when the elevator car 103 is stopped with elevator car doors 220 closed for a time that is greater than a threshold while the passenger 210 is inside the elevator car 103.

Regarding communicating with the passenger as referenced in block 310, as shown in block 310B, the method includes the controller 115A communicating instructions including one or more of restarting the elevator car 103 or exiting the elevator car 103 to the passenger 210 within the elevator car 103.

As shown in block 320 the method includes the controller 115A initiating a two-way communication with a remote service center 280, and continuing to communicate with the passenger 210 during the alert condition until the two-way communication with the remote service center 280 is established.

As shown in block 330, the method includes training the program 200. The training includes one or more of periodic receipt of training data and model updates from a remote server 270.

As used herein a transformer model is a neural network that learns context and meaning by tracking relationships in sequential data like the words in a sentence. It is used in the fields of natural language processing (NLP) and computer vision (CV). The transformer architecture implements an encoder-decoder structure. A chatbot is a computer program that uses artificial intelligence (AI) and natural language processing (NLP) to simulate conversation with human users. Chatbots use AI and NLP to help users interact with web services or apps through text, graphics, or speech. Chatbots may understand natural human language, simulate human conversation, and run automated tasks. Training of the model means feeding the model with a dataset to enable the model to make predictions or decisions. The training process involves feeding the model with data and adjusting parameters, such as biases and weighting, of the model until it can relatively accurately predict the output for new data.

In the above embodiments, sensor data may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz-typically in the 769-935 MHz, 315 Mhz and the 468 Mhz frequency range. This spectrum band below 1 Ghz is particularly useful for RF IoT (internet of things) applications. The Internet of things (IoT) describes the network of physical objects—"things"—that are embedded with sensors, software, and other technologies for the purpose of connecting and exchanging data with other devices and systems over the Internet. Other LPWAN-IoT technologies include narrowband internet of things (NB-IoT) and Category M1 internet of things (Cat M1-IoT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections also (cables/interfaces) may include connections under the Modbus serial communications protocol, managed by the Modbus Organization. Modbus is a server/client protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system, comprising:

an elevator car;

a controller operationally coupled to the elevator car; and a communication device in communication with the controller, wherein the controller is configured to execute a program, upon determining the occurrence of an alert condition related to the elevator car while a passenger or mechanic is trapped within the elevator car, to thereby communicate with the passenger or mechanic utilizing the communication device, wherein:

the communication device is one or more of: a speaker and visual display on board the elevator car, the alert condition is the elevator car being stopped at a landing with car doors closed for a time greater than a threshold, or the elevator car is stopped between floors for a time greater than another threshold, so that the passenger or mechanic is trapped within the elevator car; and the program is configured to communicate instructions for one or more of restarting the elevator car or exiting the elevator car.

2. The system of claim 1, wherein the controller includes a processor and non-transitory memory, and the program is a compressed transformer model that is stored on the non-transitory memory, so that the processor is configured to execute the program via edge computing.

3. The system of claim 2, wherein the program is a natural language processing (NLP) model.

4. The system of claim 3, wherein the program is a chatbot.

5. The system of claim 3, including a sensor operationally coupled to the elevator car and the controller is configured to receive sensor data from the sensor, whereby the controller determines the occurrence of the alert condition.

6. The system of claim 5, wherein the sensor is a LIDAR.

7. A method of communicating with an elevator passenger or mechanic on an elevator car during an alert condition, comprising:

executing a program, by a controller of the elevator car, upon determining the occurrence of the alert condition related to the operation of the elevator car while the passenger or mechanic is trapped within the elevator car;

initiating, by the controller while executing the program, a communication with a remote service center, and continuing to communicate with the passenger or mechanic utilizing a communication device during the alert condition until the communication with the remote service center is established, wherein:

the communication device is one or more of: a speaker and visual display on board the elevator car;

the alert condition is the elevator car being stopped at a landing with car doors closed for a time greater than a threshold, or the elevator car is stopped between floors for a time greater than another threshold, so that the passenger or mechanic is trapped within the elevator car; and communicating instructions by the program including one or more of restarting the elevator car or exiting the elevator car to the passenger or mechanic.

8. The method of claim 7, including:

communicating instructions including one or more of restarting the elevator car or exiting the elevator car to the passenger or mechanic.

9. The method of claim 7, including:

determining the occurrence of the alert condition when the elevator car is stopped with elevator car doors closed for a time that is greater than a threshold while the passenger or mechanic is inside the elevator car, or the elevator car is stopped between floors for a time period that exceeds another threshold.

10. The method of claim 7, including:

receiving sensor data transmitted by a sensor mounted to the elevator car or hoistway, by the controller, whereby the controller determines the occurrence of the alert condition.

11. The method of claim 7, wherein the controller includes a processor and non-transitory memory, and the program is a compressed transformer model that is stored on the non-transitory memory, so that the processor is configured to execute the program via edge computing.

12. The method of claim 9, wherein the program is a natural language processing (NLP) model.

13. The method of claim 9, wherein the program is a chatbot.

14. The method of claim 10, wherein the sensor is a LIDAR.

* * * * *